Figure 1:
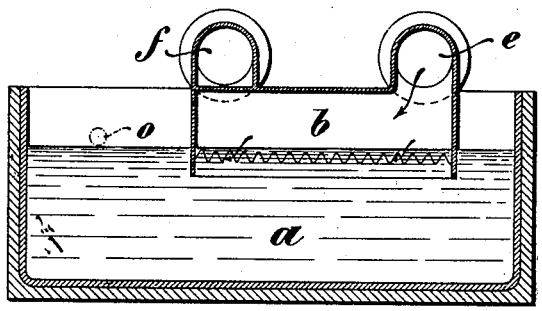

No. 773,784. PATENTED NOV. 1, 1904.
R. BRUNCK.
PROCESS OF EXTRACTING AMMONIA FROM DISTILLATION GASES.
APPLICATION FILED AUG. 6, 1903.
NO MODEL.

WITNESSES
WM. Kuehne
John A. Percival

INVENTOR
Rudolph Brunck
BY Richardson
ATTORNEYS

No. 773,784. Patented November 1, 1904.

UNITED STATES PATENT OFFICE.

RUDOLPH BRUNCK, OF DORTMUND, GERMANY, ASSIGNOR TO THE FIRM OF FRANZ BRUNCK, OF DORTMUND, GERMANY.

PROCESS OF EXTRACTING AMMONIA FROM DISTILLATION-GASES.

SPECIFICATION forming part of Letters Patent No. 773,784, dated November 1, 1904.

Application filed August 6, 1903. Serial No. 168,504. (No specimens.)

*To all whom it may concern:*

Be it known that I, RUDOLPH BRUNCK, doctor of philosophy, a subject of the King of Bavaria, (whose post-office address is No. 14 Prinz Friedrich Carl Strasse, Dortmund, Kingdom of Prussia, German Empire,) have invented a new and useful Process of Extracting Ammonia from Distillation-Gases; and I do hereby declare that the following is a full, clear, and exact description of my invention, which will enable others skilled in the art to which it appertains to make and use the same.

This invention relates to the extraction of ammonia and its compounds from the gases evolved during the dry distillation of coal, brown coal, wood, peat, and other substances, especially from the gases produced by the carbonization of coal, either in gas-works or in coke-ovens.

It is known that in order to extract the ammonia and its compounds from the distillation-gases the latter are either treated with dilute acids or with water, which latter process is now in use on a large scale. With the first process large quantities of the absorbing-acid are required, and to obtain therefrom the absorbed ammonia in the form of solid salts these large quantities of dilute acid have to be concentrated, which not only causes a great cost for fuel, but also necessitates an expensive apparatus. With the other process the disadvantages are by far greater. It requires large quantities of water, and the free ammonia has to be fixed by the addition of acids, and the dilute solution must be concentrated, or the liquor is, as most in use, mixed with lime and distilled to drive out the ammonia, which is absorbed anew by means of water or acids.

It is the object of my invention to do away with those deficiencies and to obtain solid ammonia salts on a direct way—that is, from the hot gases themselves without previously removing the vapors of water and tar contained in these gases.

To this end my improved process consists in conducting the hot gases without being deprived of the vapors of water and tar in a fine state of division through suitable concentrated acids—for instance, concentrated sulfuric acid—and maintaining the temperature of the absorbing-acid so that no condensation of the water-vapors can take place, whereby the absorbed ammonia is separated in the form of solid salts. The salt is baled out in the ordinary fashion or in any other way, and fresh acid is supplied when needed. The acid must be kept at a temperature of at least 80° to 85° centigrade, so as to prevent the steam contained in the gases from condensing. The temperature may preferably be maintained by the hot distillation-gases themselves and is regulated by previously cooling the gases as needed. In other cases the acid may be heated by means of indirect steam, utilizing for this purpose, for instance, the exhaust-steam of the engine. In order to avoid stoppages in the path of the gases, the separation of the solid salts is preferably effected in open vats only. After leaving the latter the gases may also be treated, if necessary, in other absorbing apparatus of any known construction — such as washers, scrubbers, or the like—in order to remove the last traces of ammonia. In this case only as much ammonia is to be absorbed by the acid as will cause no salt deposits and stoppages in the closed apparatus. This acid is then run into the open vats, in which the salts settle in the manner above described. The same treatment may be applied prior to conducting the gases into the vats. When proceeding in this manner, the gases are also previously cooled as needed before entering the said absorbing apparatus.

The accompanying drawings illustrate one form of carrying out the present invention.

Figure 2:
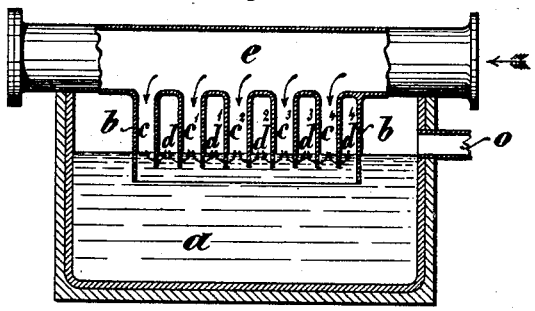
Figure 3:
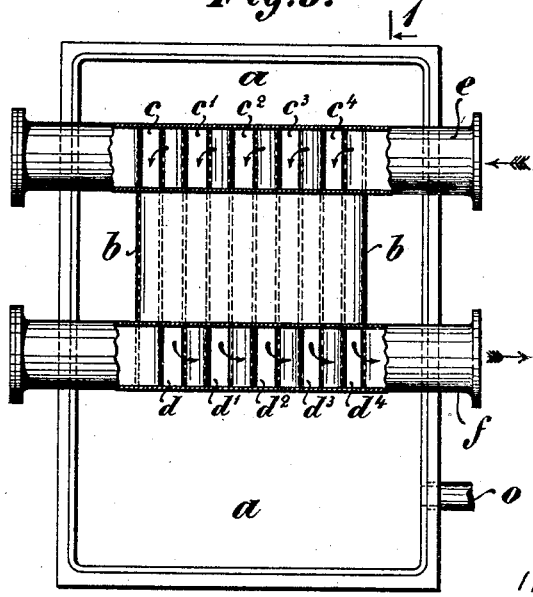

Figure 1 is a longitudinal section through line 1 1, Fig. 3. Fig. 2 is a transverse section; and Fig. 3 is a plan, part of the pipes $e$ and $f$ being broken away.

The receiving-vat $a$ is filled with concentrated acid—for instance, sulfuric acid—in which the vessel $b$ is immersed, the latter being open at the bottom and divided into a number of compartments $c$ $c'$ $c^2$ $c^3$ $c^4$ and $d$ $d'$ $d^2$ $d^3$ $d^4$, the partition-sheets of which are serrated at the open side of the vessel $b$. Across the top of these compartments there are two pipes $e$ and $f$, the former communicating with the compartments $c\ c'\ c^2\ c^3\ c^4$ and the latter with the compartments $d\ d'\ d^2\ d^3\ d^4$. The gases are first conducted into the chambers $c\ c'\ c^2\ c^3\ c^4$ through the distributing-pipe $e$ and then pass through the acid below the serrated partition-sheets, with the effect of being finely divided. They now enter into the chambers $d\ d'\ d^2\ d^3\ d^4$ and are thence led off through the collecting-pipe $f$. The ammonia salt settles on the bottom of the receiving-vat and is baled out at intervals. If necessary, the salt is freed from any tar particles by washing it with a saturated solution of the same ammonia salt. The small quantity of tar condensed on the surface of the acid during the process flows off continuously through an aperture $o$ in the vat $a$.

If according to the one method now in use the gases are treated with diluted acids, the solution must be strongly concentrated in order to recover the solid salt. In comparison with the other system of washing the gases with water as almost universally adopted a still greater advantage is secured by my improved process, because the ammonia is extracted directly in the shape of solid salts. In the other case very large quantities of water are required for extracting the ammonia completely. If the ammonia is then fixed to the acid, the solution must be concentrated, so as to obtain the ammonia salts, or the ammonical liquor has to be subjected to distillation with lime.

A further important feature of the process is the fact that the nuisance hitherto caused by the exhausted liquor and foul lime is now done away with, so that the ammonia-works are no longer put to the heavy expenses for the removal of these offensive matters. Moreover, the difficulties in obtaining permission for the working of ammonia-factories are thus obviated.

In order to show the economical advantages of my invention, both as regards the cost of erecting plants and their simple and cheap working, the carbonization of coal with by-product recovery—tar and ammonia—may be quoted as a striking example. The capital amount invested in an ordinary installation of sixty coke-ovens constructed on the new system will be about three thousand five hundred pounds sterling less than at present. The working and maintenance of the plant will allow of still greater economy, as up to fifteen hundred and fifty pounds sterling are saved per annum, which is equivalent to nearly forty per cent. of the present working expenses. As to the manufacture of illuminating-gas a great advantage is attained by the highly-reduced number of coolers and washers. Moreover, the treatment of ammonical liquor in stills is avoided, so that the steam required for this purpose is now saved.

What I claim as my invention is—

1. The process of extracting ammonia from gases produced in the dry-distillation process, which essentially consists in conducting the hot gases without being deprived of the vapors of water and tar in a fine state of division through concentrated acids in open vessels, regulating the temperature of the acid to at least 80° to 85° centigrade, removing the tar from the surface of the acid, baling out the deposited solid salts, and supplying fresh concentrated acid, substantially as and for the purpose stated.

2. The process of extracting ammonia from gases produced in the dry-distillation process, which essentially consists in conducting the hot gases without being deprived of the vapors of water and tar in a fine state of division through concentrated acids in open vessels, regulating the temperature of the acid to at least 80° to 85° centigrade, removing the tar from the surface of the acid, baling out the deposited solid salts, extracting the last traces of ammonia from the outgoing gases by special treatment with concentrated acids and conducting the resulting mixture of ammonia salt and concentrated acid into said open vessels, substantially as and for the purpose stated.

In testimony whereof I have hereunto set my hand in presence of two subscribing witnesses.

RUDOLPH BRUNCK.

Witnesses:
WILLIAM ESSENWEIN,
PETER LIEBER.